Jan. 19, 1932.  W. MODRA ET AL  1,842,043
SIPHON PUMP
Filed Oct. 7, 1929
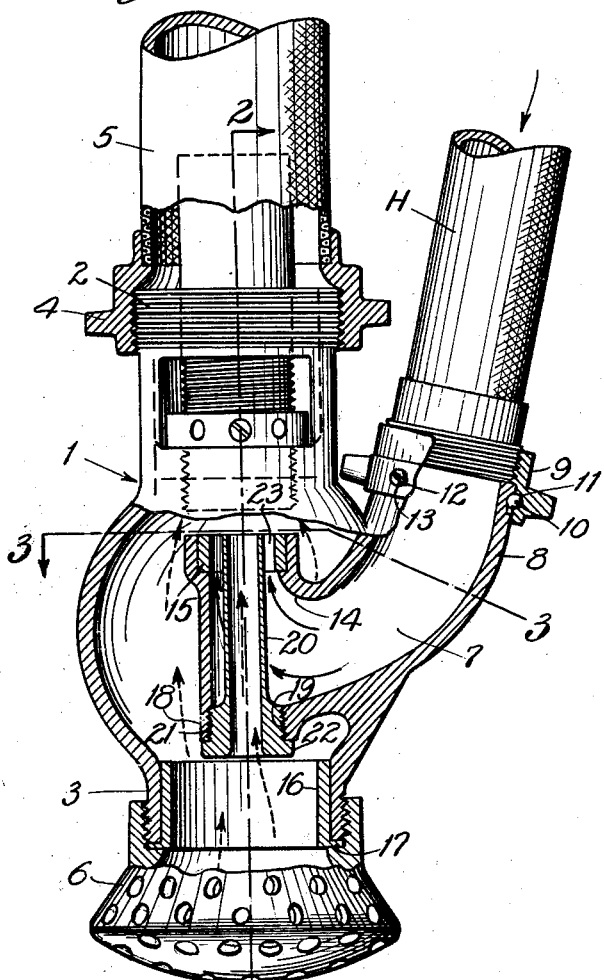
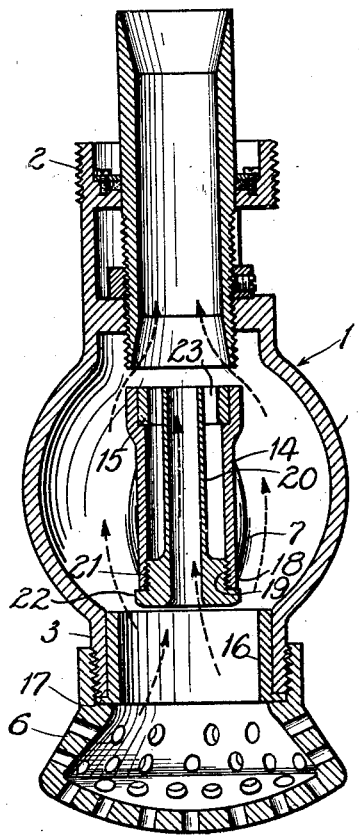
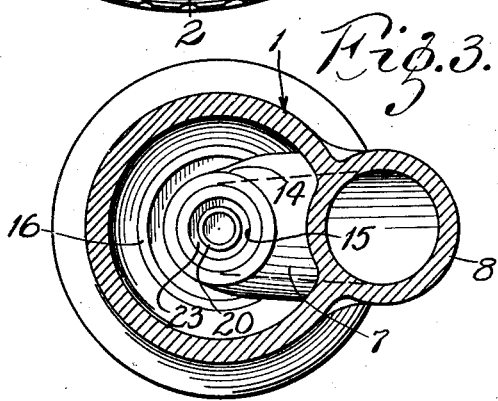
INVENTORS.
WILLIAM MODRA and
ALFRED W. MEIER
By Harry A. Deines
ATTORNEY.

Patented Jan. 19, 1932

1,842,043

UNITED STATES PATENT OFFICE

WILLIAM MODRA AND ALFRED W. MEIER, OF ST. LOUIS, MISSOURI

SIPHON PUMP

Application filed October 7, 1929. Serial No. 397,923.

Our invention has relation to improvements in siphon pumps, and consists in the novel features of construction more fully set forth in the specification and pointed out in the claims.

The present invention is an improvement over that of our Patent No. 1,648,238, and in addition to the objects set forth in said patent, has for its principal object the provision of means for increasing the area of the passage for the flow of the idle water, and at the same time increasing the velocity of the injector stream.

These objects are accomplished by arranging a tube within the injector nozzle on the longitudinal axis of the pump, said tube being open at both ends to permit the flow of water therethrough, and being spaced from the inner wall of the injector nozzle so as to reduce its orifice to a constricted annular passage. The manner in which this improvement accomplishes its object will be more fully apparent from a detailed description of the invention in connection with the accompanying drawings, in which:

Fig. 1 is a combined side elevation and vertical longitudinal section of our improved siphon pump; Fig. 2 is a vertical longitudinal section taken on the line 2—2 of Fig. 1; and Fig. 3 is a horizontal cross-section taken on the line 3—3 of Fig. 1.

Referring to the drawings, 1 represents the pump housing having upper and lower cylindrical terminals 2 and 3 respectively, each of which terminates in screw threads, those of terminal 2 receiving the fitting 4 of a hose 5 and those of terminal 3 receiving a strainer 6. An inverted goose-neck 7 is formed integral with the bowl of housing 1, a part 8 of said goose-neck extending outside of the housing and having a coupling nut 9 mounted on ball-bearings 10 in a raceway 11 contiguous to the outer edge of the gooseneck. The ball-bearings 10 operate to hold the nut 9 in place, and are insertible in the race 11 through a threaded hole 12 in the nut 9, said hole being closed by a set-screw 13.

A hose H may be connected to the gooseneck 7 by means of said coupling for the purpose of injecting water or steam into the pump housing. This will be more fully explained when the operation of the pump is described.

The inner end 14 of goose-neck 7 is pointed toward the terminal 2 of the housing, and is provided with a removable bushing or nozzle 15 whose axis coincides with that of the cylindrical terminal 2.

The terminal 3 has a removable throat or lining 16, the lower end of which is provided with a flange 17 extending over the edge of the terminal 3, said lining being held in place by the strainer 6, or a nut substituted therefor, in case the strainer is omitted. A boss 18 is formed at the bottom of the inner end 14 of the goose-neck and a threaded opening 19 extends through said boss into the passageway through the goose-neck to receive the straight tube 20, which has threads 21 and a polygonal portion 22 at its lower end whereby it may be tightly secured into the threaded opening 19. The opening through the tube 20 is continued through the nut 22 where it flares outwardly to permit the water to flow into the tube more readily. The diameter of the tube is somewhat smaller than the inside diameter bushing 15 so as to provide a constricted annular outlet 23 for the injector water that passes through the goose-neck 7.

From the foregoing, it is apparent that the tube 20, communicating as it does with the body of idle water that is being pumped, increases the amount of passageway for this water, which also flows around the inner end 14 of the goose-neck. In addition to thus expediting the flow of water through the pump, the tube 20 reduces the volume of water through the injector, and thus constitutes means for increasing the velocity of the flow of injector water from the nozzle 15. Thus, a siphon pump embodying the improvements herein described, will operate at far greater efficiency that that of our patent above referred to, both in the amount of water pumped in a given time and in the expenditure of injector water.

Having described our invention, we claim:
1. A siphon pump comprising a housing having axially alined inlet and outlet for the fluid to be pumped, a goose-neck traversing the housing and terminating within the housing in an injector nozzle pointed toward said outlet, means in the goose-neck for restricting the orifice of the nozzle, said means having a duct in the path of the fluid from inlet to outlet of the pump, and means for connecting the goose-neck with a source of fluent medium under pressure.

2. A siphon pump comprising a housing having an inlet and an outlet, a goose-neck traversing the housing and terminating within the housing in an injector nozzle pointed toward said outlet, a tube in the goose-neck and open to the said inlet and outlet, said tube operating to restrict the nozzle orifice, and means for connecting the goose-neck with a source of fluent medium under pressure.

3. A siphon pump comprising a housing having an inlet and an outlet for the fluid to be pumped, said inlet and outlet being disposed on the longitudinal axis of the pump, a goose-neck traversing the housing and terminating in an injector nozzle on said axis and pointed toward the pump outlet, an open tube disposed in the goose-neck on said axis in the path of flow of the fluid, said tube operating to restrict the nozzle orifice, and means for connecting the gooseneck with a source of fluent medium under pressure.

In testimony whereof we hereunto affix our signatures.

WILLIAM MODRA.
ALFRED W. MEIER.